United States Patent
Bacchus et al.

(10) Patent No.: US 12,172,607 B2
(45) Date of Patent: Dec. 24, 2024

(54) ATMOSPHERIC PROPERTY ESTIMATION SYSTEM AND METHOD IN DYNAMIC ENVIRONMENTS USING LIDAR

(71) Applicant: GM GLOBAL TECHNOLOGY OPERATIONS LLC, Detroit, MI (US)

(72) Inventors: Brent N Bacchus, Sterling Heights, MI (US); Donald K Grimm, Utica, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 571 days.

(21) Appl. No.: 17/446,673

(22) Filed: Sep. 1, 2021

(65) Prior Publication Data
US 2023/0063683 A1  Mar. 2, 2023

(51) Int. Cl.
*B60S 1/08* (2006.01)
*G01S 7/48* (2006.01)
*G01S 17/95* (2006.01)

(52) U.S. Cl.
CPC .......... *B60S 1/0859* (2013.01); *G01S 7/4808* (2013.01); *G01S 17/95* (2013.01)

(58) Field of Classification Search
CPC ...... B60S 1/0859; G01S 7/4808; G01S 17/95; G01S 7/4802; G01W 1/14
See application file for complete search history.

(56) References Cited

U.S. PATENT DOCUMENTS

| | | | | |
|---|---|---|---|---|
| 5,557,347 | A * | 9/1996 | Johnson | F41G 3/145 356/139.08 |
| 9,139,204 | B1 | 9/2015 | Zhao et al. | |
| 9,453,941 | B2 | 9/2016 | Stainvas Olshansky et al. | |
| 11,407,013 | B2 * | 8/2022 | Kim | B08B 3/02 |
| 2013/0275007 | A1 * | 10/2013 | Chen | B60S 1/0844 701/49 |
| 2019/0219691 | A1 * | 7/2019 | Meehan | G01S 13/865 |
| 2022/0390612 | A1 * | 12/2022 | Wang | G01S 7/497 |

* cited by examiner

*Primary Examiner* — Jelani A Smith
*Assistant Examiner* — Paul A Castro
(74) *Attorney, Agent, or Firm* — Lorenz & Kopf LLC

(57) ABSTRACT

Systems and methods are provided for estimating atmospheric properties using a LIDAR sensor. A control system includes a LIDAR sensor configured to detect a distance to an object, and an intensity of light reflected by the object. A controller's a target selection module determines whether the object is a target for use in estimating the atmospheric properties. A data collection module collects values of the distance and the intensity as detected by the LIDAR sensor. The atmospheric properties are determined based on the values of the distance and the intensity. In response to the determined atmospheric properties, the actuator is operated to effect an action.

18 Claims, 4 Drawing Sheets

ATMOSPHERIC PROPERTY ESTIMATION SYSTEM AND METHOD IN DYNAMIC ENVIRONMENTS USING LIDAR

INTRODUCTION

The present disclosure generally relates to the estimation of properties such as atmospheric visibility in dynamic environments and more particularly, relates to systems and methods for determining environmental properties such as visibility range and precipitation intensity using light detection and ranging (LIDAR).

Various activities, whether operating under human or machine (autonomous) operation, rely on data collected by a variety of sensors. Applications such as vehicles may use various sensors to operate advanced driver assistance systems (ADAS) and autonomous vehicle operation. LIDAR sensors may be one type of sensor used to evaluate vehicle surroundings. LIDAR sensors transmit and receive light to collect data enabling the creation of a virtual representation of the environment. LIDAR sensors may be used to identify stationary and moving objects on or near the roadway for use in making control decisions.

Relevant data may be collected by sensors under a variety of environmental conditions which may include variables that have an effect on the data being collected. For example, with a sensor such as LIDAR that transmits a signal and evaluates a return of the signal, environmental conditions may be the source of a reduction (attenuation) in the returned signal. In some instances, when the signal intersects with raindrops at a short distance from the transmitter, the raindrops may reflect enough of the signal back to the receiver so that the raindrops are detected as an object. In other instances, precipitation may absorb a portion of the transmitted signal so that a degraded signal is received. As a result, performance of a sensor and the ability to use the data collected by the sensor are impacted by the prevailing environmental conditions. When the data is used by a control system, it is useful to know whether environmental conditions are having an effect on the data being collected.

Approaches for determining signal attenuation are often calibrated to static environments. However, many sensors are used in dynamic environments where the surroundings and conditions are unfamiliar, moving, and constantly changing.

Accordingly, systems that are statically calibrated may be challenged to accurately determine the extent of an effect that environmental conditions are having on the data being collected.

Accordingly, it is desirable to provide systems and methods that accurately estimate atmospheric properties in real-world, unfamiliar and dynamic environments. Furthermore, other desirable features and characteristics of the present invention will become apparent from the subsequent detailed description and the appended claims, taken in conjunction with the accompanying drawings and the foregoing technical field and background.

SUMMARY

In various embodiments, a systems and methods are provided for estimating atmospheric properties in unfamiliar and dynamic environments and for using those properties to effect control actions. An exemplary system may include a LIDAR sensor configured to detect a distance to an object, and to detect an intensity of light reflected by the object. A controller's target selection module may determine whether the object is a viable target for use in estimating the atmospheric properties. A data collection module may collect values of the distance and of the intensity as detected by the LIDAR sensor. The atmospheric properties may be determined based on the collected values of the distance and of the intensity. In response to the determined atmospheric properties, the actuator may be operated to effect an action.

In additional embodiments, determining the atmospheric properties includes determining, by a solve module and from the values of the distance and the intensity, a reflectivity of the object, and an extinction coefficient of the environment.

In additional embodiments, determining the atmospheric properties includes converting, by a conversion module, the extinction coefficient to a visibility range of the environment.

In additional embodiments, determining the atmospheric properties includes converting, by a conversion module, the extinction coefficient to a precipitation intensity of the environment.

In additional embodiments, the controller is configured to determine optical properties of the object, including reflectivity of the object.

In additional embodiments, the optical properties of the object are determined only after first encountering the object in the environment.

In additional embodiments, the target selection module is configured to reject the object as the viable target, based on an orientation of the object relative to the LIDAR sensor; and to reject, by the target selection module and based on a color of the object as detected by a camera, the object as the viable target based on the detected color.

In additional embodiments, determining the atmospheric properties includes relating the intensity of light reflected by the object with the distance to the object, and with a reflectance of the object, and with an extinction coefficient of the environment.

In additional embodiments, the actuator includes a windshield wiper motor. The atmospheric properties include rainfall intensity. Operating the actuator to effect the action includes modifying a speed of the windshield wiper motor in response to the rainfall intensity.

In additional embodiments, collecting the values includes collecting the values for multiple objects over a period of time, and determining the atmospheric properties includes determining the atmospheric properties based on the values of the multiple objects.

In a number of other embodiments, a method for estimating atmospheric properties in an environment, the method includes detecting, by a LIDAR sensor, a distance to an object, and an intensity of light reflected by the object. A target selection module of a controller determines whether the object is a viable target for use in estimating the atmospheric properties. A data collection module of the controller collects values of the distance and the intensity detected by the LIDAR sensor. The atmospheric properties are determined based on the values of the distance and the intensity. In response to the determined atmospheric properties, an actuator is operated to effect an action.

In additional embodiments, determining the atmospheric properties includes determining, by a solve module of the controller and from the values of the distance and the intensity, a reflectivity of the object, and an extinction coefficient of the environment.

In additional embodiments, determining the atmospheric properties includes converting, by a conversion module of the controller, the extinction coefficient to a visibility range of the environment.

In additional embodiments, determining the atmospheric properties includes converting, by a conversion module of the controller, the extinction coefficient to a precipitation intensity of the environment.

In additional embodiments, the controller determines optical properties of the object, including reflectivity of the object.

In additional embodiments, the optical properties of the object are determined only after first encountering the object in the environment.

In additional embodiments, the target selection module rejects the object as the viable target based on an orientation of the object relative to the LIDAR sensor.

In additional embodiments, determining the atmospheric properties includes relating the intensity of light reflected by the object, with the distance to the object, and with a reflectance of the object, and with an extinction coefficient of the environment.

In additional embodiments, the actuator is a windshield wiper motor, and the atmospheric properties comprise rainfall intensity. Operating the actuator to effect the action includes modifying a speed of the windshield wiper motor in response to the rainfall intensity.

In a number of additional embodiments, a vehicle includes a system for estimating atmospheric properties in an environment. A LIDAR sensor is configured to detect a distance to an object, and an intensity of light reflected by the object. An actuator is mounted on the vehicle. A controller is carried by the vehicle and is configured to: determine whether the object is a viable target for use in estimating the atmospheric properties; collect, by a data collection module, values of the distance and the intensity detected by the LIDAR sensor; determine the atmospheric properties, based on the values of the distance and the intensity; and operate, in response to the determined atmospheric properties, the actuator to effect an action of the vehicle.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
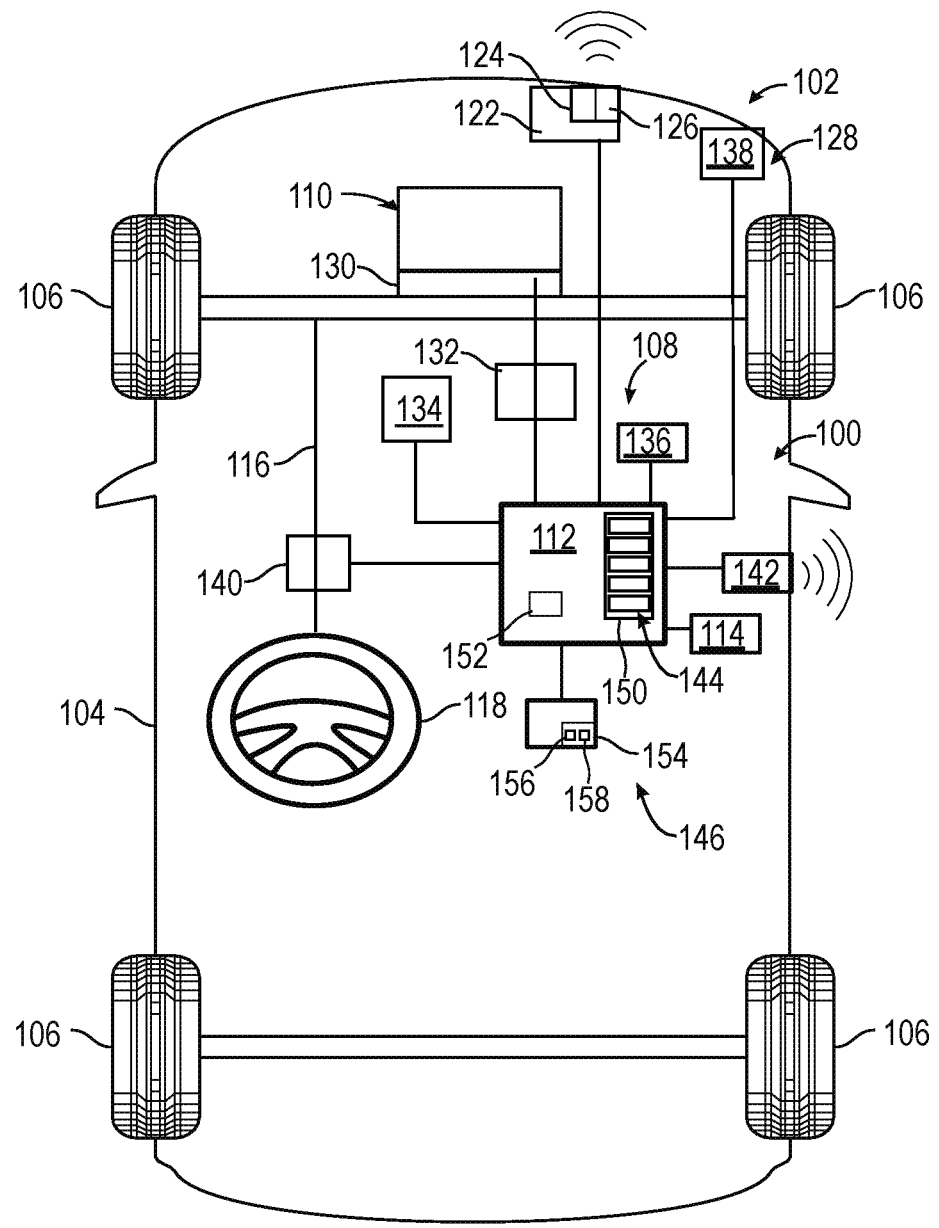
FIG. 1 is a functional diagram of a system for estimating and using atmospheric properties illustrated in a vehicle application, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of steering systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

In a number of embodiments, systems and methods are provided that accurately estimate atmospheric properties in real-world, unfamiliar and dynamic environments. For example, a LIDAR system may be used to estimate environmental properties such as visibility, precipitation intensity, etc., without using system pre-calibration based on known objects. Instead, environmental properties are determined real-time without knowing what objects may be encountered in the environment and without knowing the optical properties of those unknown objects beforehand. In an embodiment, attenuation of a LIDAR signal due to environmental conditions is determined, in general, by tracking multiple objects over time, learning the optical properties of those objects, calculating attenuation of the signal due to the environment, and using the extent of attenuation to determine, using empirical relationships, useful properties such as visibility range, precipitation rate, and others, and using those determined properties to carry out control operations.

The systems and methods disclosed herein, provide accurate environmental property estimations in multiple environments. Estimations of current visibility are beneficially made without relying solely on static pre-calibration, may be determined independent of surface conditions (e.g. wet roads) and may be made using objects with unknown optical properties such as reflectivity. Previously characterized optical properties of objects may be saved and retrieved to provide quick estimates or refinements, in future encounters with the same object.

In an embodiment, a sensor transmits a signal, receives a return of the signal, and collects the return signal as data to select plural objects (targets) and track the viable targets over a period of time. The data may include return signal intensities as a function of range to the targets. The data for each target may be averaged, and the average values may be used in one or more empirical relationships to determine optical properties of the targets such as target reflectance from which the extinction coefficient of the atmosphere may be determined. Values such as visibility distance, precipitation intensity, etc. may be determined. The determined values may be used to effect control actions such as operating actuators (slowing the speed of a vehicle by its throttle control and/or increasing the lead/following distance of a vehicle via an adaptive cruise control system), providing alerts, transmitting information to other users, and for other purposes. In an embodiment, data on characterized targets may be saved in a reference map for use during future encounters with the same object.

With reference to FIG. 1, illustrated is one example of an atmospheric property estimation system 100 for determining environmental properties and for using those determined properties to effect control actions of a vehicle 102. As will be discussed further herein, the atmospheric property estimation system 100 enables the accurate estimation of environmental conditions using available sensors. The disclosed atmospheric property estimation system 100 is beneficial in the applications described herein, because it may function by targeting encountered, unknown objects without relying on predicting what objects will actually be present in an environment. In addition, the disclosed atmospheric property estimation system 100 does not rely solely on a projected pre-calibration based on such predictions. Further, the disclosed atmospheric property estimation system 100 is not focused on reading road surfaces, which may be unpredictably variable.

The disclosed atmospheric property estimation system 100 is applicable to vehicle based applications and to other applications where improved sensing system performance in variable and complex environments is desirable. So, although the current disclosure may describe systems and methods in the passenger vehicle context, various features and characteristics disclosed herein may be used in other contexts, and any applications where improved sensor/system fidelity is desirable. For example, various other control system and electro-mechanical system environments, as well as different types of moving and stationary systems may benefit from the features described herein. Thus, no particular feature or characteristic is constrained to a passenger vehicle or to a vehicle system, and the principles are equally embodied in other vehicles, and in other machinery or equipment, and in other applications.

In some embodiments, the atmospheric property estimation system 100 is associated with the vehicle 102 as illustrated in FIG. 1. In various embodiments, the vehicle 102 may be an automobile, such as a car, a sport utility vehicle, a truck, or another ground vehicle. In other applications, the vehicle 102 may be an aircraft, a spacecraft, a watercraft, or any other type of vehicle. In other embodiments, the application may not involve a vehicle, but may include stationary applications where other objects move in the environment. For exemplary purposes this disclosure will be discussed in the context of use in the vehicle 102. As depicted in FIG. 1, the vehicle 102 generally includes a body 104, wheels 106, an electrical system 108 and a powertrain 110. The wheels 106 are each rotationally coupled to the vehicle 102 near a respective corner of the body 104. The body 104 may be arranged on, or integrated with, a chassis and substantially encloses the other components of the vehicle 102. In general, the electrical system 108 includes a controller 112 a power supply 114, and various coupled components. In general, the powertrain 110 includes a torque generating device such as an internal combustion engine, an electric motor, or a combination thereof, along with a mechanism to vary to amount of speed/torque generated based on operating conditions.

As can be appreciated, the vehicle 102 may be any one of a number of different types of conventional or autonomous automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 102 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

The vehicle 102 includes a steering system 116 that may have a steering actuator 118 and/or a steering wheel 120. In various embodiments, the steering system 116 further includes various other features (not depicted in FIG. 1), allowing desired articulation angles such as between the intermediate connecting shafts, and tie-rods. The steering actuator 140 may effect steer-by-wire and/or autonomous steering that uses electrical and/or electro-mechanical systems to control the vehicle steering in response to, or instead of, a traditional steering wheel 120.

The atmospheric property estimation system 100 further includes a sensor suite 122 with one or more sensors that sense observable conditions of the environment or of other aspects associated with the vehicle 102. The sensor suite 122 is coupled with the controller 112. In this embodiment, the sensor suite includes, but is not limited to, a LIDAR sensor 124 and a camera 126. The LIDAR sensor 124 emits beams of near-infrared light. The light beams may reflect off objects in their trajectories and return to a detector of the LIDAR sensor 124. Components (not shown) of the LIDAR sensor 124 may include a transmitter and a receiver. The transmitter of the LIDAR sensor 124 emits light, that when striking nearby objects reflects back to the receiver of the LIDAR sensor 124. In general, the atmospheric property estimation system 100 receives, records and processes information on the light beam's roundtrip data, which may include measuring return intensity, distance and time. The atmospheric property estimation system 100 may render a three-dimensional representation of the environment around the vehicle 102 using the data collected by the LIDAR sensor 124. The camera 126 provides a two-dimensional optical image of the same environment providing additional data, including color of sensed objects. The LIDAR sensor 124 and the camera 126 capture complementary information about the environment, which may be co-registered by calibrating the two sensors, such as by estimating a rigid-body transformation between the reference coordinate system of the two sensors. The rigid-body transformation allows reprojection of the three-dimensional points of the coordinate frame of the LIDAR sensor 124 with the two-dimensional coordinate frame of the camera 126. The co-registered camera imagery and LIDAR data may be used to construct a dynamic map containing features of the environment.

The atmospheric property estimation system 100 includes an actuator system 128, which may be used to implement actions of the vehicle 102, including in response to data collected by the sensor suite 122 and to determinations made by the controller 112 based on that data. Accordingly, the actuator system 128 is communicatively coupled with the controller 112. In this embodiment, the actuator system 128 includes a throttle 130 of the powertrain 110, an adaptive cruise system actuator 132, an operator interface 134, a windshield wiper actuator 136, lights 138, a steering actuator 140, and a transmitter 142. In other embodiments, any number of other actuators may be coupled with the controller 112. The throttle 130 may be a valve plate actuator, a motor controller, or other actuator that varies the output of the powertrain 110, such as by varying sped and/or output torque. The adaptive cruise system actuator 132 may be a cruise system controller or other device that controls aspects of the cruise system such as lead/following distance, speed, or other parameters. The operator interface 134 may be a visual display, audio speaker, tactile actuator, or other human-machine interface that provides outputs that may be sensed by a human operator. The windshield wiper actuator 136 may be an electric motor, or a motor operated by another means, for driving the wipers at variable speeds. The lights 138 may be headlights, including high and low beams, tail-lights, hazard lights, or other lights for illumination and/or warning purposes. The steering actuator 140 may be an electric motor or other actuator to control the angle of the front wheels 106. The transmitter 142 may be a cellular device or other wireless/radio device for communicating information, and in a number of embodiments, may be a transceiver with bi-directional communication capability.

The controller 112 receives various signals from the sensor suite 122 and controls operation of the atmospheric property estimation system 100 based thereon, including by making determinations and by effecting control of the actuator system 128 in response to those determinations. In general, the controller 112 generates control signals that are delivered to the actuator system 128 to control the response of the various actuators, for example, to effect operations in operating/driving the vehicle 102. In various embodiments, the controller 112 includes any number of modules 144 that are communicatively coupled with each other, and with other aspects of the atmospheric property estimation system 100, such as by way of a communication bus. The control logic of the atmospheric property estimation system 100 may reside on any one of the control modules 144 and/or in a separate controller or controllers. For example, the vehicle 102 may include an additional number of control modules 144 to control various aspects such as of the atmospheric property estimation system 100 including of the actuator system 128, along with those of the powertrain 110, the body 104, braking for the wheels 106, and other functions and systems of the vehicle 102. Additionally, one or more network communications protocols such as CAN or Flexray communication may be used to interface between the various control modules 144 and other devices in the vehicle 102.

In general, the atmospheric property estimation system 100 includes a control system 146 that may, in general, be operated by the controller 112. The controller 112 may be configured as any number of controllers and/or microcontrollers in communication with each other. The controller 112 is coupled with each of the power supply 114, which may include a battery, the sensor suite 122, the actuator system 128, and may be coupled with other devices of the vehicle 102. The controller 112 may accept information from various sources, process that information, and provide control commands based thereon to effect outcomes such as operation of the vehicle 102 and its systems, including of the atmospheric property estimation system 100. In the depicted embodiment, the controller 112 includes a processor 150 and a memory device 152, and is coupled with a storage device 154. The processor 150 performs the computation and control functions of the controller 112, and may comprise any type of processor or multiple processors, single integrated circuits such as a microprocessor, or any suitable number of integrated circuit devices and/or circuit boards working in cooperation to accomplish the functions of a processing unit. During operation, the processor 150 may execute, such as via the modules 144, one or more programs 156 and may use data 158, each of which may be contained within the storage device 154 and as such, the processor 150 controls the general operation of the controller 112 in executing the processes described herein, such as the processes described further below in connection with FIG. 4.

The memory device 152 may be any type of suitable memory. For example, the memory device 152 may include volatile and nonvolatile storage in read-only memory (ROM), random-access memory (RAM), and keep-alive memory (KAM), for example. KAM is a persistent or non-volatile memory that may be used to store various operating variables while the processor 150 is powered down. The memory device 152 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 112. In certain embodiments, the memory device 152 may be located on and/or co-located on the same computer chip as the processor 150. In the depicted embodiment, the memory device 152 may store the above-referenced programs 156 along with one or more stored values of the data 158 such as for short-term data access.

The storage device 154 stores the data 158, such as for long-term data access for use in automatically controlling the vehicle 102 and its systems. The storage device 154 may be any suitable type of storage apparatus, including direct access storage devices such as hard disk drives, flash systems, floppy disk drives and optical disk drives. In one exemplary embodiment, the storage device 154 comprises a source from which the memory device 152 receives the programs 156 that execute one or more embodiments of one or more processes of the present disclosure, such as the steps of the process 400 (and any sub-processes thereof) described further below in connection with FIG. 4. In another exemplary embodiment, the programs 156 may be directly stored in and/or otherwise accessed by the memory device 152. The programs 156 represent executable instructions, used by the electronic controller 112 in processing information and in controlling the vehicle 102 and its systems, including the atmospheric property estimation system 100. The instructions may include one or more separate programs 156, each of which comprises an ordered listing of executable instructions for implementing logical functions. The instructions, when executed by the processor 150 support the receipt and processing of signals such as from sensors, and the performance of logic, calculations, methods and/or algorithms for automatically controlling the components and systems of the vehicle 102. The processor 150 may generate control signals for the actuator system 128, and to automatically control various components and systems of the vehicle 102 based on the logic, calculations, methods, and/or algorithms. As will be appreciated, the data 158 storage device 154 may be part of the controller 112, separate from the controller 112, part of one or more of the controllers, or part of multiple systems. The memory device 152 and the data storage device 154 work together with the processor 150 to access and use the programs 156 and the data 158.

While the components of the control system 146 are depicted as being part of the same system, it will be appreciated that in certain embodiments these features may comprise multiple systems. In addition, in various embodiments the control system 146 may comprise all or part of, and/or may be coupled to, various other vehicle devices and systems, such as, among others, the atmospheric property estimation system 100 and/or other systems of the vehicle 102.

Figure 2:
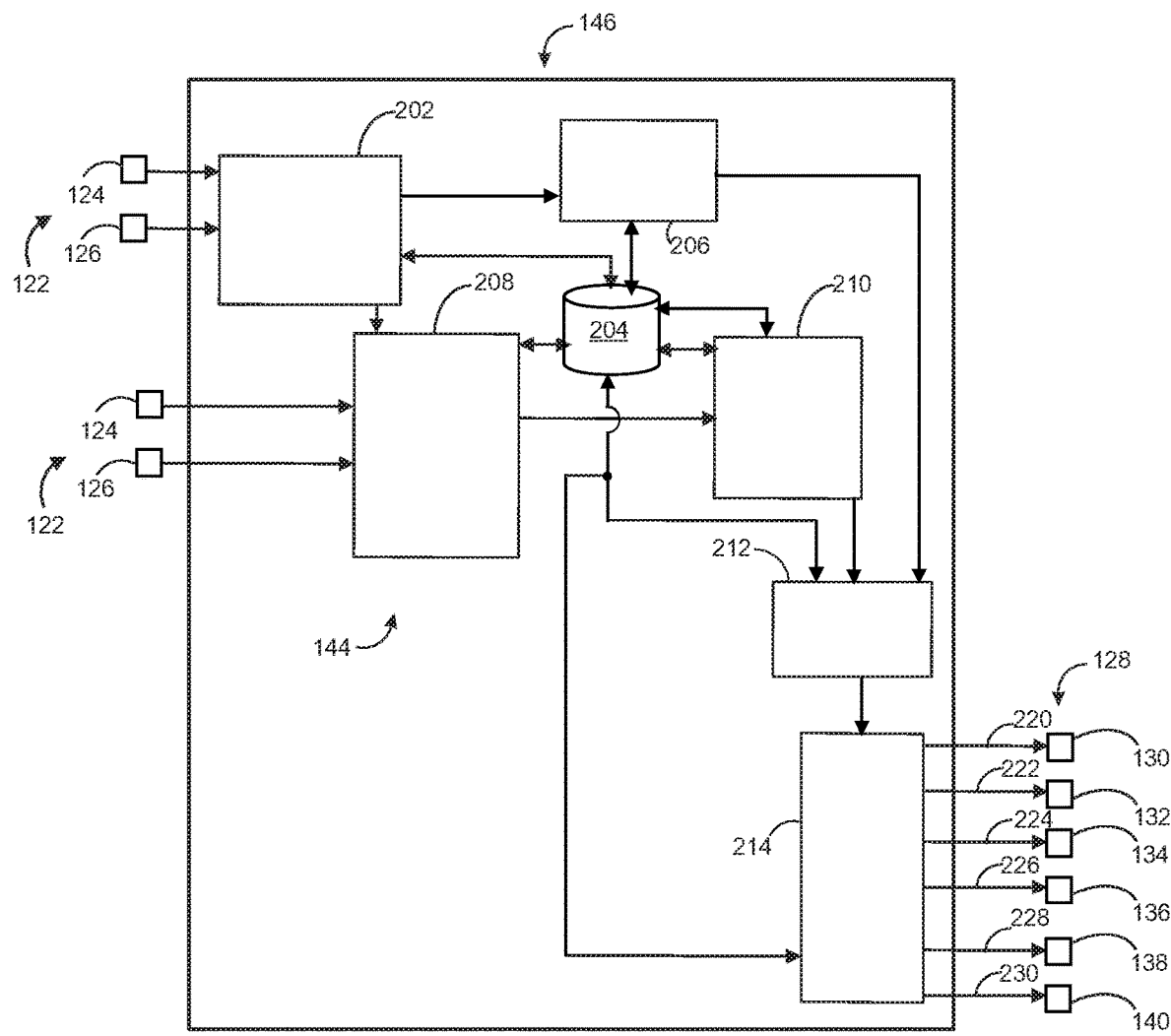
FIG. 2 is a flow diagram of the system of FIG. 1, in accordance with various embodiments.

In an embodiment as shown in FIG. 2, a configuration of the control system 146 may include the number of modules 144. The modules 144 may include a target selection module 202 for evaluating and selecting viable objects for the atmospheric property estimation system 100. The target selection module 202 may be supplied with various information such as from the sensor suite 122 (e.g. LIDAR sensor 124, camera 126), and from a datastore 204, for use in identifying objects as targets for further evaluations. The datastore 204 may reside in, or may comprise, the data storage device 154, or another device and may be the source of the data 158 and the programs 156 for use by the various modules 144. An association module 206 may evaluate the identified targets for potential association with previously encountered and evaluated targets, that may have been previously saved in the datastore 204. A data collection module 208 manages data collection. Data may be collected from multiple targets at multiple distances (ranges) from the vehicle 102, over a time period.

A solve module 210 may carry out calculations using the available data 158 and the programs 156, such as may be accessed from the datastore 204. The LIDAR intensity may be recorded as the return strength of the transmitted light beam and, in general, relates to reflectivity (an optical property), of the target object. The solve module 210 may employ empirical relationships between return signal intensity, distance to target, target reflectance, and environment extinction coefficient to determine properties (e.g. reflectance) of the selected targets and useful environmental properties (e.g. extinction coefficient). The determined properties of the selected targets may be saved in the datastore 204 within a map at a GPS location for later reference such as by the association module 206. In a number of embodiments, the data 158 may be stored in maps, tables or another form and includes values, such as location and reflectivity, corresponding to evaluated targets for future identification and retrieval.

A conversion module 212 converts the determined environmental properties to useful parameters. For example, a determined extinction coefficient (also known as attenuation coefficient), may be converted to a visibility range in the environment and/or to a precipitation intensity in the environment. An output control module 214 may transmit the parameters to users, or may use the parameters to generate control signals to initiate control actions of the vehicle 102, such as by operation of the actuator system 128. The foregoing arrangement of modules 144 is one example, and the current disclosure is not limited to the exemplary arrangement. In addition, other modules or submodules may be used in the control scheme/algorithms of the control system 146 for the same functions or other functions, or for coordination purposes.

Figure 3:
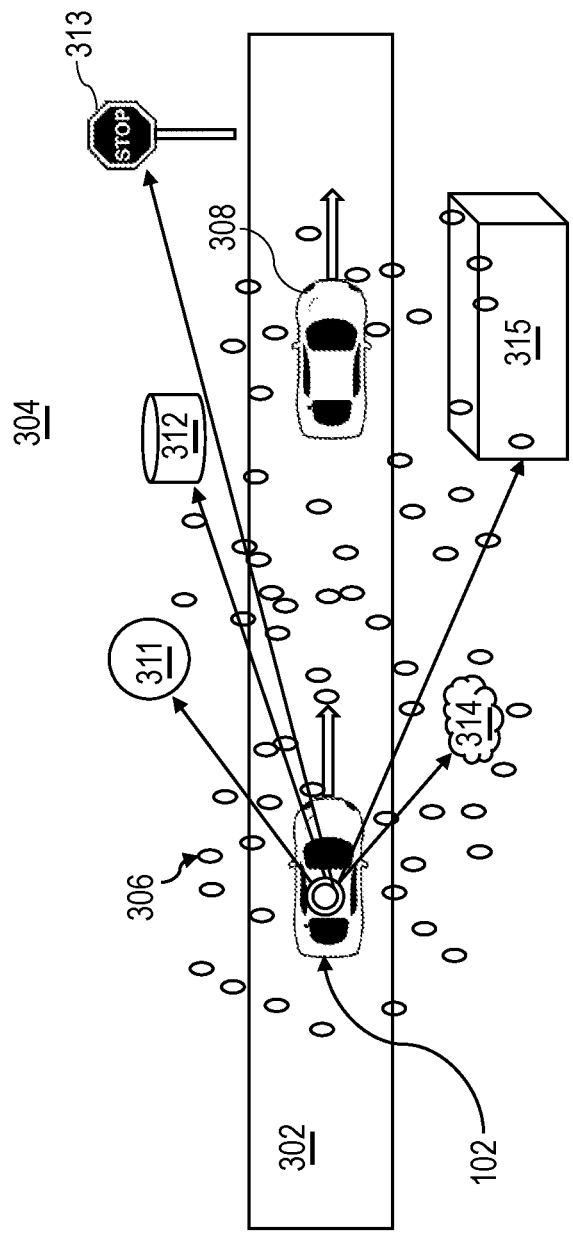
FIG. 3 is a diagram illustrating a scene depicting a vehicle employing the system of FIG. 1, in accordance with various embodiments.

Referring additionally to FIG. 3, a scene illustrates the vehicle 102 as a host vehicle operating on a roadway 302. An environment 304 in which the vehicle 102 is operating may be characterized by a number of properties and in this example includes the presence of a precipitation 306. A number of objects such as other vehicles 308, and other objects 311-315 may be present in the environment 304. The objects may be unknown, meaning they may not have been encountered previously, their optical properties are not known, and their suitability as targets for determining environmental properties is unknown. To provide information useful in operation of the vehicle, the available objects 308 and 311-315 within range of the sensor suite 122 may be considered for use as targets. With inputs from the LIDAR sensor 124 and from the camera 126, the atmospheric property estimation system 100, such as through the target selection module 202, considers the available objects. Criteria for selecting objects as viable targets may include shape, color, surface homogeneity, orientation and other factors that affect the ability to determine an object's optical properties such as reflectivity. Preference is given to objects that exhibit homogenous optical properties from the point of view of the sensor suite 122, and objects with a high variation in light intensity may be discounted or rejected.

In the current embodiment, object shape is considered by the target selection module 202, with a preference being given to relatively readily identified shapes such as those of a sphere (object 311), a cylinder (object 312), a flat sign (object 313) and a rectangle/wall (object 315). Accordingly, the objects 311, 312, 313 and 315 may remain candidates as potential targets after a shape screening filter is applied. The other vehicle 318, and the irregular shrub (object 314) may be rejected as target candidates due to their complex shape which may tend to reflect light in many directions, including away from the host vehicle 102. Inputs from the camera 126 may be used to consider color consistency of the objects, with a preference being given to those objects with a consistent color. Accordingly, objects with a plurality of shades/colors may be rejected due to their non-homogenous reflectivity. In addition, objects made of a number of various materials with different optical properties may be rejected, due to their inconsistent reflectivity. In addition, the orientation of the objects is considered. A preference is given to objects oriented generally toward the host vehicle 102, so as to reflect light consistently back toward the host vehicle 102 as it moves. For example, if the object 313 (road sign), faces transverse to the roadway 302, it may be rejected as a candidate for targets due to the low level of a return light beam intensity to the LIDAR sensor 124.

Figure 4:
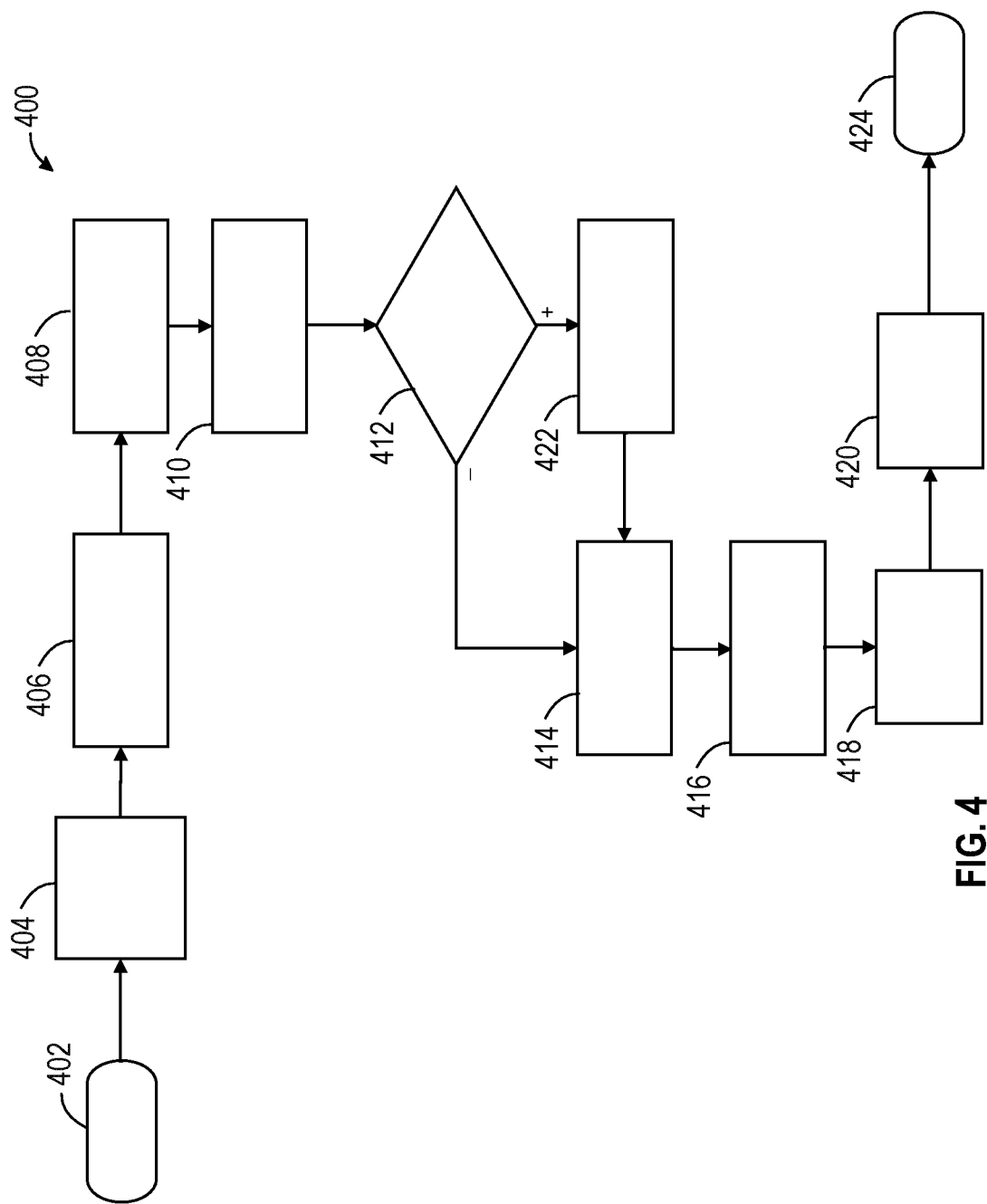
FIG. 4 is a flowchart illustrating a method that may be performed by the system for estimating and using atmospheric properties of FIG. 1, in accordance with various embodiments.

With reference to FIG. 4, depicted is a flowchart of a process 400 including methods for atmospheric property estimation. The process 400 may be utilized in connection with the vehicle 102 and with the atmospheric property estimation system 100 of FIGS. 1-3, in accordance with exemplary embodiments. As can be appreciated in light of the disclosure, the order of operation within the process 400 is not limited to the sequential execution as illustrated in FIG. 4, but may be performed in one or more varying orders as applicable, and in accordance with the present disclosure. In addition, the process 400 may encompass fewer than all of the illustrated steps, and/or may include other steps/operations.

The process 400 may begin 402 with the vehicle 102 and the atmospheric property estimation system 100 in operation in a given environment. The atmospheric property estimation system 100 may run continuously, intermittently, or may be triggered by other inputs such as may be based on weather conditions, light conditions, or other factors. For example, the process 400 may be initiated 402 on its own, or may be initiated in response to a signal indicating a possible degradation of environmental conditions. The process 400, such as through the target selection module 202, considers 404 detected objects in the point cloud of the LIDAR sensor 124.

The available objects may be considered 404, and a set of plural objects that best match the defined criteria for viable targets may be selected. As described above, the criteria for selecting objects as targets may include shape, color, surface homogeneity, orientation and other factors that affect the ability to determine an object's optical properties, such as consistent reflectivity. Those objects that have a shape that lends itself to determining the object's optical properties are considered candidates as targets. Those objects that have a consistent shape (sphere, cylinder, rectangle, wall flat surface, etc.), may be acceptable. Those objects that do not have a consistent shape may be rejected. Those objects that exhibit reflected light intensity variations above a threshold may be discarded 406 as candidates. For example, the objects as reflective light sources that do not distribute light evenly back toward the host vehicle 102 may be rejected. The threshold may be set based on modelling or characteristic testing for a given application, and may be retrieved from the datastore 204. Those objects that do not face generally toward the host vehicle 102 may be rejected 408. For example, when an angle between the surface normal of the object and a line to the host vehicle exceeds a threshold, the object may be rejected 408 as a candidate. The threshold, such as forty-five degrees, may be set at a magnitude where insufficient light is reflected toward the host vehicle 102, may be set based on modelling or characteristic testing for a give application, and may be retrieved from the datastore 204. Those objects that exhibit a color variance above a threshold may be discarded 410. For example, with input from the camera 126, the target selection module may discard 410 objects that have color variations that do not support readily determining the object's optical properties. The threshold may be set based on modelling or characteristic testing for a given application and may be retrieved from the datastore 204.

When the set of targets has been selected, the process 400 proceeds to determine 412 whether the selected targets match existing objects saved in the datastore 204, such as in a map of the area in which the vehicle 102 is operating. When the determination is negative, meaning a selected target does not match a saved object, the process 400 proceeds to track and collect data 414 on the target, such as by the data collection module 208. For each target, its reflective intensity and distance are recorded at various ranges (distances) from the host vehicle 102 over a time window. The time window is set based on the availability of objects, and based on the speed of movement of the scene. For example, at high speeds of the vehicle 102, the time window may be relatively short (e.g. 1-2 seconds), and at relatively lower speeds of the vehicle 102, the time window may be longer, encompassing several seconds. The recorded intensities and distances are saved in corresponding pairs, such as in the datastore 204 recording intensity values as a function of range (distance between the vehicle 102 and the target object).

Using the data collected on the targets, the reflectivity of the target objects and the environment's extinction factor may be determined 416, such as by the solve module 210. Intensity p, distance z, target reflectance p and environment extinction coefficient α are related by the empirical relationship:

$$p = C \frac{\rho}{z^2} e^{-2\alpha z}.$$

Assuming a constant extinction coefficient α, the relationship is solved for the extinction coefficient α and the reflectance ρ given multiple measurements of intensity p and distance z. Every unique target will have different value of reflectance ρ. C is a known value from the specifications of the LIDAR sensor 124. With two unknown parameters (target reflectance ρ and environment extinction coefficient α), and multiple target objects (M):

Let $\theta^T = (\alpha \ \rho_1 \ldots \rho_M)$ be the unknown parameters for M objects, and let $Z=[z_{ij}]$ and $P=[p_{ij}]$ be N×M matrices of the jai distance and intensity measurement of object i.

The general solution $\hat{\theta}$ is given by $$\hat{\theta} = \underset{\theta}{\mathrm{argmin}} \sum_{ij} \left( K \frac{\rho_i}{z_{ij}^2} e^{-2\alpha^2 z_{ij}^2} - p_{ij} \right)^2, 0 \leq \rho_i \leq 1, \alpha \geq 0$$

which may be solved, such as by the solve module 210, using any constrained optimization approach to find the target's reflectance and the environment's extinction coefficient.

Optionally, the solve module 210 may use a linear least squares approach requiring less computing capacity, such as by the following:

Let $\tilde{p}_{ij} = \ln \frac{p_{ij} z_{ij}^2}{K}$, $\tilde{\rho}_i = \ln \rho_i$ and $\tilde{\theta}^T = (\alpha \ \tilde{\rho}_1 \ \ldots \ \tilde{\rho}_M)$, then $\hat{\theta} = (A^T A)^{-1} \mathrm{vec} \tilde{P}$ For $\tilde{P}=[\tilde{p}_{ij}]$ and $A=S-2 \cdot \mathrm{vec}(Z) e_0^T$ where is the N dimensional basis vector of coordinate i and $S^T = (e_{q_1}^T \ldots e_{q_M}^T)$ where $q_i$ is the index of the object corresponding to elements in vec(Z).

A more numerically stable solution is found as $\hat{\theta} = (A^T A + \lambda T)^{-1} \mathrm{vec} \tilde{P}$ where λ is a regularization parameter.

The above approaches may be used to initialize first solutions and constraints may be incorporated by method such as clipping solutions. If reflection coefficients of some target objects are known, such as from the map in the datastore 204, they may be treated as a constant simplifying the optimization, or the previous estimates may be fused with the newly collected data to improve the saved map values. In a number of embodiments, solutions may be found iteratively, such as by using a Kalman filter, and results may be made more robust, such as by using random sample consensus.

With the target object reflectivities determined 216, the values may be saved for the particular object, such as in the datastore 204, for later retrieval. The data for an object may be saved with its corresponding GPS coordinates for accurate location information. To this end, this description of the process 400 returns now to the determination 412 step. When the determination 412 is positive, meaning the object matches a saved object in the datastore 204, the process 400 proceeds to retrieving 422 of the saved reflectively for the object at the given GPS coordinates. The process 400 may then track and collect data 414, specifically intensities and distances for the object. The extinction factor may then be determined 416, without a need to solve for the reflectivity. However as noted above, the data may be used to refine the saved reflectivity value of the object and once refined, may then be resaved 418, if appropriate.

Arriving at a conversion 420 step, the process 400, such as through the conversion module 212, converts the determined 416 values to useful parameters. For example, estimated values of the extinction coefficient α may be converted 420 to rainfall rate R using the empirical relationship $\alpha=aR^b$, where the constant α=0.01 and the constant b=0.6. Estimated values of the extinction coefficient α may be converted 420 to visibility distance x using $$x = \frac{3.912}{\alpha}$$

(where the source of attenuation is water vapor and another constants may be used dependent on source of atmospheric attenuation).

A dynamic object map overlay may be created using the collected data and may be communicated for aggregation with other vehicle inputs. Accordingly, the process 400 may include sharing data (including the object map) with other nearby vehicles such as over vehicle-to-vehicle communication, to the cloud such as via a cellular signal or another mechanism. The transmitter 142 may be employed to communicate external to the vehicle 102. Further data fusion may occur on other vehicles and/or on other remote sources and may be further shared including in available route planning and informational applications. For example, the collected data and the resultant determinations may be communicated to warn against driving in visibility restricted areas. The process 400 may continue to run when the vehicle 102 is in operation or may end 424, such as when the vehicle 102 is powered down or conditions no longer require atmospheric property estimation.

Information such as the conversions 420 to precipitation intensity and visibility range may be used in control actions. For example and with reference to FIGS. 1-3, the controller 112 may use the precipitation intensity and/or the visibility range to adjust the throttle 130 of the powertrain 110 in line with conditions. In another example, the controller 112 may use precipitation intensity and/or visibility range to adjust the adaptive cruise system actuator 132, such as by sending a signal 222. For example, the lead distance between the host vehicle 102 and the vehicle 303 may be increased. In embodiments, the operator interface 134 may be activated by the controller 112 to alert the operator of the vehicle 102 to current conditions and/or to suggest actions based on the precipitation intensity and/or visibility range.

In a number of embodiments, the controller 112 via a signal 226, may adjust speed of the windshield wiper actuator 136 in proportion to precipitation intensity. In another example, the controller, via a signal 228, may adjust the lights 138 (high beams, low beams, or hazard lights), in response to precipitation intensity and/or visibility distance. The controller 112, via a signal 230, may operate the steering actuator 140. For example, in snowy conditions autonomous steering may be modified to effect a different turning rate than that used in dry conditions.

Accordingly, by evaluating available objects, including those that are unknown and have unknown optical properties, LIDAR sensors may be employed to determine atmospheric properties useful in making control decisions. The disclosed system may effectively operate in dynamic environments in a moving vehicle with surround moving objects, and with unknown objects. In addition, effective results are achieved regardless of the presence of wet, snowy, icy or poorly maintained roadways. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for estimating atmospheric properties in an environment, the system comprising:
   a light detection and ranging (LIDAR) sensor configured to detect, by a signal, a distance to an object, and an intensity of light reflected by the object;
   an actuator; and
   a controller configured to:
   determine, whether the object is a viable target for use in estimating the atmospheric properties, wherein a viable target meets selected criteria for determining optical properties of the object, including rejecting, based on a homogenous variation of the reflected light intensity above a threshold, the object as a viable target;
   collect values of the distance and the intensity for the object as detected by the LIDAR sensor;
   compute, based on a return of the signal, the optical properties including a reflectivity, of the object;
   track, after determining the optical properties, the object over time;
   determine the atmospheric properties, based on the values of the distance and the intensity; and
   operate, in response to the determined atmospheric properties, the actuator to effect an action.

2. The system of claim 1, wherein the determine the atmospheric properties comprises:
   determine, by the controller and from the values of the distance and the intensity, an extinction coefficient of the environment.

3. The system of claim 2, wherein the determine the atmospheric properties further comprises:
   convert, by the controller the extinction coefficient to a visibility range of the environment.

4. The system of claim 2, wherein the determine the atmospheric properties further comprises:
   convert, by the controller, the extinction coefficient to a precipitation intensity of the environment.

5. The system of claim 1, wherein the controller is configured to evaluate the object as the viable target based on shape, color, surface homogeneity, orientation and consistent reflectivity of the object.

6. The system of claim 1, wherein the object properties of the object are determined only after first encountering the object in the environment.

7. The system of claim 1, wherein the determine the atmospheric properties comprises:
   relate the intensity of light reflected by the object, and with the distance to the object, and with a reflectance of the object, and with an extinction coefficient of the environment.

8. The system of claim 1, wherein the actuator comprises a windshield wiper motor and wherein the atmospheric properties comprise rainfall intensity, wherein the operate the actuator to effect the action comprises modify a speed of the windshield wiper motor in response to the rainfall intensity.

9. The system of claim 1, wherein the collect the values comprises collect the values for multiple objects over a period of time, and wherein the determine the atmospheric properties comprises determine the atmospheric properties based on the values of the multiple objects.

10. A method for estimating atmospheric properties in an environment, the method comprising:
    detecting, by a light detection and ranging (LIDAR) sensor using a signal, a distance to an object, and an intensity of light reflected by the object;
    determining, by a controller, whether the object is a viable target for use in estimating the atmospheric properties, wherein a viable target meets selected criteria for determining optical properties of the object, including rejecting, based on a homogenous variation of the reflected light intensity above a threshold, the object as a viable target;
    collecting, by the controller, values of the distance and the intensity for the object as detected by the LIDAR sensor;
    computing, by the controller and based on a return of the signal, the optical properties including a reflectivity, of the object;
    tracking, by the controller using the LIDAR sensor, after determining the optical properties, the object over time;
    determining the atmospheric properties, based on the values of the distance and the intensity; and
    operating, in response to the determined atmospheric properties, an actuator to effect an action.

11. The method of claim 10, wherein the determining the atmospheric properties comprises:
    determining, by the controller and from the values of the distance and the intensity, an extinction coefficient of the environment.

12. The method of claim 11, wherein the determining the atmospheric properties further comprises:
    converting, by the controller, the extinction coefficient to a visibility range of the environment.

13. The method of claim 11, wherein the determining the atmospheric properties further comprises:
    converting, by the controller, the extinction coefficient to a precipitation intensity of the environment.

14. The method of claim 10, comprising evaluating, by the controller, the object as the viable target based on shape, color, surface homogeneity, orientation and consistent reflectivity of the object.

15. The method of claim 10, wherein the object properties of the object are determined only after first encountering the object in the environment.

16. The method of claim 10, wherein the determining the atmospheric properties comprises relating the intensity of light reflected by the object, with the distance to the object, and with a reflectance of the object, and with an extinction coefficient of the environment.

17. The method of claim 10, wherein the actuator comprises a windshield wiper motor and wherein the atmospheric properties comprise rainfall intensity, wherein the operating the actuator to effect the action comprises modifying a speed of the windshield wiper motor in response to the rainfall intensity.

18. A vehicle including a system for estimating atmospheric properties in an environment, the vehicle comprising:
    a light detection and ranging (LIDAR) sensor configured to detect a distance to an object, and an intensity of light reflected by the object;
    an actuator mounted on the vehicle; and
    a controller carried by the vehicle and configured to:
    determine whether the object is a viable target for use in estimating the atmospheric properties, including whether the object has a reflected light intensity variation below a threshold;
    collect data on the object including values of the distance and the intensity detected by the LIDAR sensor;
    compute, using the data collected on the object, object properties including a reflectivity of the object, by solving a relationship between the intensity, the distance, and the reflectivity of the object;
    determine the atmospheric properties, based on the object properties; and
    operate, in response to the determined atmospheric properties, the actuator to effect an action of the vehicle.

* * * * *